Patented May 1, 1945

2,374,812

UNITED STATES PATENT OFFICE 2,374,812

METHOD OF PRODUCING MODIFIED UREA ALDEHYDE RESIN

Samuel S. Gutkin, Brooklyn, N. Y., assignor to Falk & Company, Carnegie, Pa., a corporation of Pennsylvania No Drawing. Application August 14, 1943, Serial No. 498,728

8 Claims. (Cl. 260—42)

This invention relates to a specialized resinous urea-aldehyde alkyd product, and relates more particularly to urea-aldehyde alkyd products the specific properties of which are determined by a specialized modification in the series of steps by which the resinous product is made.

The application herein is a continuation-in-part of my application Serial No. 192,587, filed February 25, 1938 (issued April 14, 1942, as Patent No. 2,279,312), and of my co-pending application Serial No. 435,640, filed March 21, 1942.

A primary object of my invention, as in the patent and application above noted, is so to link the alkyd reactions to a urea-aldehyde condensate of the infusible or full heat-hardening type that there is obtained a resin possessing certain inherent properties of urea-aldehyde resins of that sort, such as the properties of hardness, gloss, flow, and color stability, coupled in measure with alkyd properties of flexibility, durability, and susceptibility to modification, by so conducting the process in which the resin is produced that fusibility or solubility is retained in the reaction mass, or batch, during the formation of the resin without impairing in the product those characteristics of heat-hardening urea-aldehyde resin which have been above noted.

The further and more specific object of my invention, and the feature in which the resin which is the subject matter hereof differs from the resin specifically claimed in my above noted patent, is to utilize as a modifying component included in the resin one of the lower acyclic monocarboxylic acids, or a mixture of such acids. By the term "lower acyclic monocarboxylic acids" as herein used, I intend to distinguish from the fatty oil acids, all of which are straight chain acids having more than 10 carbon atoms in their carbon chains. The fatty oil acids from which I herein distinguish are acyclic acids such as linseed oil acid, stearic acid, eleostearic (tung oil) acid, oleic acid, palmitic acid, myristic acid, and lauric acid. The acyclic monocarboxylic acids, the use of which is herein disclosed, distinguish from fatty oil acids by having no more than 10 carbon atoms in their non-nuclear group; that is, in the group, or structure, attached to the carboxyl of the acid.

The resinous products made in accordance with my invention differ from those disclosed in my above identified patent by being as a class somewhat softer and more soluble than those other products and by having greater adhesiveness. They differ slightly in detail from each other, but have in common the properties of film-formation, adhesion, and strength. All are homogeneous products in that they exhibit no inherent tendency toward separation after their formation.

Generally stated, my invention includes the initial formation of a urea-aldehyde condensation product which would be, if unmodified, heat-hardening and infusible, and includes the involvement of that initial condensate in reactions and modifications conducted with such determinative and modifying reagents, and under such conditions that the fusibility and solubility of the reaction batch is maintained throughout the process, and in measure is retained in the final product while also retaining in the product fundamental characteristics of the infusible urea-aldehyde condensates. This I do by effectively reacting the fundamentally infusible urea-aldehyde condensate with an unmodified polyhydric alcohol and then with a polybasic carboxylic acid, without destroying the above noted desirable properties inherent in the infusible urea-aldehyde resins. Following this, I modify the resultant resinous product of condensation and partial esterification with an acyclic monocarboxylic acid which has no more than 10 carbon atoms in its non-nuclear group; that is, in the group or structure, attached to the carboxyl of the acid.

As typical examples of aldehydes which may be reacted with urea to give the urea-aldehyde condensate, I may name acetaldehyde, butyraldehyde, propyaldehyde, crotonaldehyde, and formaldehyde. As typical examples of unmodified polyhydric alcohol usable in my process, I may give glycerine, pentaerythritol, triethylene glycol, diethylene glycol, and sorbitol. As typical of polybasic carboxylic acids which may be used, I may give phthalic anhydride, maleic anhydride, malic acid and fumaric acid. It may be stated generally that I may use in my process any aldehyde, any unmodified polyhydric alcohol, and any polybasic carboxylic acid of the sort found suitable in the alkyd resin art.

As typical of acyclic monocarboxylic acids of the sort having no more than 10 carbon atoms in their non-nuclear group, I may give acetic acid, propionic acid, butyric acid, valeric acid, caproic acid, acrylic acid, glycolic acid, crotonic acid, sorbic acid, lactic acid, hydracrylic acid, hydroxy butyric acid, hydroxy valeric acid, glycine, alanine, aminobutyric acid, valine, leucine, norleucine, and the like acyclic monocarboxylic acids.

My invention may be exemplified as follows:

Example No. 1

A mixture was made of 120 parts by weight of urea and 300 parts by weight of commercial (40%) formaldehyde. The mixture was allowed to stand at normal room temperature until an opaque resinous mass formed.

It may be here noted that in the satisfactory conduct of my process, as in this and following examples, the temperature at which the urea and aldehyde are condensed may be as low as normal room temperature, or the condensation may be accelerated by very gentle heating. If any heating is employed it should be careful and should be discontinued at the first signs of gelation in order that the condensate may not set so rapidly as to inhibit the succeeding stages of the process.

To 50 parts by weight of this urea-aldehyde condensate there were added 150 parts by weight of high-test glycerine which formed a homogeneous mass with the urea-formaldehyde condensate. This mass was heated to a temperature adequate to drive off water and to fuse the polybasic carboxylic acid which is added in this stage of the process, care being taken that the temperature of the batch does not greatly exceed 320° F. in order to insure against decomposition in the batch, pending the next stage of the process. The polybasic carboxylic acid, which in this example specifically was phthalic anhydride, was added in a quantity of 148 parts by weight, and the batch was held at such moderately elevated temperature until capable of forming a clear bead.

It is to be understood, for this example and for succeeding examples, that the polybasic carboxylic acid may be added before or during temperature elevation, or may be added after the homogeneous mass of condensate and polyhydric alcohol has been brought to the maximum temperature desired. It is necessary merely that the polyhydric alcohol be added early in the process so that a homogeneous mass of the condensate and the polyhydric alcohol is formed for reaction with the polybasic carboxylic acid. It will be noted that in effecting partial esterification of the condensate, I use an unmodified polyhydric alcohol; that the polyhydric alcohol is in excess of the polybasic carboxylic acid; and that both of them are in excess of the condensate. The immediate result is the maintenance of fusibility and solubility in the batch so that esterification is effected without the use of a solubilizing agent such as a resin or solubilizing acid with the polyhydric alcohol. The final result is that I obtain a product in which the valuable properties of heat-hardening resin have not been sacrificed to the maintenance of solubility during its formation.

To make modification in the resinous material formed as above with partial esterification of the condensate by reaction with the phthalic anhydride, heating of the material at moderately elevated temperatures was continued. Without permitting the material to gel, I added 37 parts by weight of glacial acetic acid with heating from the maximum temperature of the stage next preceding to a temperature slightly above 400° F. With acetic acid, as with all the acyclic monocarboxylic acids herein contemplated, a temperature of about 400° F. was adequate to incorporate the monocarboxylic acid in the reaction batch without clouding. The batch may, if desired, be brought to a temperature substantially above 400° F. if care be taken to discontinue heating when the first signs of gelation appear in the batch.

The product was a thick, viscous, resinous material of good clarity and color. It is indicated for use in adhesives, as a plasticizer for nitrocellulose, and when extended with suitable solvent, such as the aromatic hydrocarbon solvents, ester solvents, alcohols, ketones, catalytic solvents or mixtures of such solvents, is useful as a varnish coating.

As a variation under this same example, it may be noted, that I have added as much as 100 parts by weight of glacial acetic acid, making the addition by small increments to avoid separation. It may be noted that in this example, and as a fact running through all exemplifications of my method, the greater the effective addition of the monocarboxylic acid the less viscous will the product be, and the greater will be its solubility in the common organic solvents.

Example No. 2

The procedure of this example was identical with that of Example No. 1 and the materials used were identical with materials of that example, except that 98 parts by weight of maleic anhydride were used to replace the 148 parts by weight of phthalic anhydride used in Example No. 1.

Example No. 3

The procedure of this example was identical with that of Example No. 1 and the materials used were identical with those of that example, except that 116 parts by weight of fumaric acid were used instead of 148 parts by weight of phthalic anhydride used in Example No. 1.

It should be noted that examples paralleling Examples Nos. 2 and 3 are not hereinafter given in conjunction with the use of other variable compounds within the bounds of my invention as herein broadly disclosed. It is, however, to be understood that in every subsequent example in which the use of phthalic anhydride is indicated, an approximately equivalent molar content of maleic anhydride, fumaric acid, or other polybasic carboxylic acid, may be used equivalently to the phthalic anhydride as the polybasic carboxylic acid component of my resin, the procedure in each instance being identical with that described when phthalic anhydride is used. I have observed only slight difference between the products in which phthalic anhydride was used as the polybasic carboxylic acid and those products in which some other polybasic carboxylic acid was used.

Example No. 4

In this example the procedure and materials of Example No. 1 were duplicated down to the final stage, in which stage lactic acid was added as the monocarboxylic acid in place of the glacial acetic acid as used in Example No. 1.

That is, to 50 parts by weight of the resinous condensate made as in Example No. 1, I added 154 parts by weight of high-test glycerine, which formed a homogeneous mass with the urea-formaldehyde condensate. Similarly to the procedure of Example No. 1, 148 parts by weight of phthalic anhydride was added and the mixture was heated to about 300° F. until capable of forming a clear bead.

Then 64 parts by weight of lactic acid (85% U. S. P.) was added, and heating was continued until the temperature reached about 400° F. and held at this temperature for about 45 minutes. The temperature was then taken to about 450° F. and the batch was cooled.

The product was a thick, viscous, resinous material of good clarity and color. The same uses are indicated for this product as for the product obtained by modification with glacial acetic acid.

*Example No. 5*

In this example the procedure and materials of Examples Nos. 1 and 4 were duplicated down to the final stage, in which stage acrylic acid was added as the monocarboxylic acid in place of the glacial acetic acid used in Example No. 1. 76 parts by weight of acrylic acid were added in small increments while raising the temperature of the reaction mass, or batch, from the maximum temperature of the next preceding stage, or about 300° F., to a temperature of about 400° F. The batch was held at that temperature for about 35 minutes, and the temperature was then raised to about 450° F. The batch was then cooled.

Apparently all of the acrylic acid went into the batch in the same manner as the other acyclic acids, to give a resinous product of the same light color obtained by addition of glacial acetic acid in the final modification. When spread in a film as for deposit from solution in a suitable organic solvent such as the aromatic hydrocarbon solvents, the film exhibited hardness greater than that obtained in the example in which acetic acid was used.

*Example No. 6*

A mixture was made of 120 grams of urea and 165 grams of commercial acetaldehyde, approximately 100% pure. 200 cc. of water was added while the mixture was allowed to stand at normal room temperature until an opaque resinous mass formed.

To 50 grams of the condensate thus formed there was added 154 grams of high-test glycerine which formed a homogeneous mass with the urea-acetaldehyde condensate. This mass was heated to a temperature approaching 300° F. until water was driven off, and at that temperature 148 grams of phthalic anhydride was added and the batch was held until capable of forming a clear bead.

I then added 37 grams of glacial acetic acid and heated the batch to about 400° F., holding it at that temperature for about 30 minutes and then permitted it to cool.

The product was a clear, dark almost rigid material. It appears suitable for use as a plasticizer and as an ingredient of colloidal dispersions usable as coating compositions.

The procedure and materials of Example No. 6 were duplicated down to the final modification, in which stage I added in one instance lactic acid, and in another instance acrylic acid.

*Example No. 7*

A mixture was made of 120 parts by weight of urea and 280 parts by weight of crotonaldehyde. This mixture was heated gently on a steam bath until an opaque resinous condensate was formed.

To 50 parts by weight of the condensate formed as above, I added 148 parts by weight of high-test glycerine, which formed a homogeneous mass with the urea-crotonaldehyde condensate. This mass was heated to a temperature approaching 300° F. until water was driven off, 148 parts by weight of the phthalic anhydride being added. The batch was held at that temperature until capable of forming a clear bead.

I then added 37 parts by weight of glacial acetic acid and continued heating to a temperature of about 400° F., at which temperature I held at batch for a short time and then permitted it to cool.

The product was very viscous, semi-solid material which was a dark reddish-brown in color. It was closely analogous to the products obtained in which acetaldehyde was used in the initial condensate.

The procedure and materials of Example No. 7 were duplicated down to the last addition, in which stage I added in one instance lactic acid, and in another instance acrylic acid. In both instances there was only slight difference in the products from the product obtained in Example No. 7 using glacial acetic acid.

*Example No. 8*

To 100 parts by weight of the resinous product obtained in Example No. 1, I added 100 parts by weight of linseed oil, the temperature of the batch being maintained at about 430° F. while the linseed oil was very slowly added. The product was a coating material having by virtue of its resin content exceptional capacity to acquire gloss and hardness in a film.

*Example No. 9*

To 100 parts by weight of the resinous product made in accordance with Example No. 4, I added 100 parts by weight of linseed oil, the temperature of the resinous product being maintained at about 430° F. while the linseed oil was very slowly added. The product was a coating material having by virtue of its resin content exceptional capacity to acquire gloss and hardness in a film.

*Example No. 10*

To 100 parts by weight of the resinous product obtained from the procedure of Example No. 5, I added 100 parts by weight of linseed oil, the temperature of the resinous product being maintained at about 430° F. while the linseed oil was very slowly added.

The product was a coating material having by virtue of its resinous content exceptional capacity to acquire gloss and hardness in a film.

The procedure of Examples Nos. 8, 9 and 10 was duplicated, adding, however, 100 parts by weight of soya bean oil in place of the linseed oil added in those examples. The product differed from the product obtained in Examples Nos. 8, 9 and 10 only in a measure to be anticipated from the different properties of the linseed oil and the soya bean oil which were added.

All the several resinous products obtained by practicing my method have good solubility in the solvents which are above noted. As the content of monocarboxylic acid in the final product is increased, the viscosity of the product is decreased and the solubility of the product correspondingly increases to the extent that in many instances solubility in mineral spirits is obtained.

Although I use an initial condensate inherently possessing full heat-hardening properties, by using an unmodified polyhydric alcohol, by causing that alcohol to solubilize the initial condensate, and without the use of added solubilizing agents, I am able to maintain the reaction mass, or batch, in a fusible condition which permits the reaction with the polybasic carboxylic acid effectively to take place. Also, by the avoidance of high temperature in the batch prior to the addition of the monocarboxylic acid in the final ste the batch being still in solubilized condition by virtue of the use of an unmodified polyhydric alcohol and the conditions of its use, I am enabled to make substantial additions of monocarboxylic acids of the sort to which this present invention relates. As above noted, the quantity of such acids which is added is not critical.

In distinction from my issued patent, to which reference has been above made, I utilize as the final modifying ingredient of my resin acyclic monocarboxylic acids other than the fatty oil acids, and which are distinguished from the fatty oil acids by having no more than 10 carbon atoms in the group attached to the carboxyl, or nuclear group, of the acid. I have herein noted a substantial number of such acyclic monocarboxylic acids, and have exemplified several of them. I have noted specifically herein four of the class of polybasic carboxylic acids, namely phthalic anhydride, maleic anhydride, malic acid and fumaric acid. It is to be understood that any other polybasic carboxylic acid which the art has found to be suitable for the alkyd modification of urea-aldehyde resin may be employed while conforming to the principles of my invention and following the procedure of my method as outlined in the examples above given. I have also given as examples of polyhydric alcohols other than glycerine, pentaerythritol, triethylene glycol, diethylene glycol, and sorbitol. When used as equivalents for glycerine, these alcohols are used in quantities of approximately molar equivalency with the glycerine specifically exemplified herein. This is also true of aldehydes such as butyraldehyde and propylaldehyde, which have not specifically been exemplified herein.

It may be emphasized that the result of my method is to give a resin suitable for various uses, and which is particularly adapted for use in hard varnish films, and in adhesives; in which the initial condensate is a resin of full heat-hardening properties, and in which the advantageous features attendant upon those properties are retained by so including the polyhydric alcohol and the polybasic carboxylic acid in the reaction mass, or batch, from which the resin is formed that I am able to obtain the desired sequence of reactions without the addition of any solubilizing agent such as a resin, or a solubilizing acid such as monocarboxylic acid, prior to the reaction which involves the polybasic carboxylic acid. The product resins thus retain hardness, gloss, and alkali resistance characteristic of the full heat-hardening type in resins which are soluble in common commercial solvents, and which are suitable for use in adhesives, plastics and coatings. In these resins, also, the character of the monocarboxylic acid included as a modifying addition in the process of their manufacture gives the resins effective solubility in a wide range of commercial organic solvents.

I claim as my invention:

1. The herein described method of producing a modified urea-aldehyde resin by following the sequential steps of preparing a urea-aldehyde condensate by reacting urea and aldehyde in the approximate proportion of 1 mol. of urea to 2 mols. of aldehyde at low temperature to a stage at which an opaque resinous mass is formed, while the urea-aldehyde condensate is still ungeled forming a homogeneous mass of the condensate with an unmodified polyhydric alcohol and reacting the said homogeneous mass with a polybasic carboxylic acid with heating to a temperature sufficiently high to drive off water and fuse the polybasic carboxylic acid and not substantially above 320° F., the proportions of the additions to each other and to the urea-aldehyde condensate being such that the polyhydric alcohol is in excess of the polybasic carboxylic acid and such that each of them is in excess of the condensate, and then with further temperature elevation making at least one addition of acid selected from the class consisting of the acyclic monocarboxylic acids having no more than 10 carbon atoms in the group attached to the carboxyl of the acid and mixtures of such acids.

2. The herein described method of producing a modified urea-formaldehyde resin by following the sequential steps of preparing a urea-formaldehyde condensate by reacting urea and formaldehyde in the approximate proportion of 1 mol. of urea to 2 mols. of formaldehyde at low temperature to a stage at which an opaque resinous mass is formed, while the urea-formaldehyde condensate is still ungeled forming a homogeneous mass of the condensate with an unmodified polyhydric alcohol and reacting the said homogeneous mass with a polybasic carboxylic acid with heating to a temperature sufficiently high to drive off water and fuse the polybasic carboxylic acid and not substantially above 320° F., the proportions of the additions to each other and to the urea-formaldehye condensate being such that the polyhydric alcohol is in excess of the polybasic carboxylic acid and such that each of them is in excess of the condensate, and then with further temperature elevation making at least one addition of an acid selected from the class consisting of the acyclic monocarboxylic acids having no more than 10 carbon atoms in the group attached to the carboxyl of the acid and mixtures of such acids.

3. The herein described method of producing a modified urea-aldehyde resin by following the sequential steps of preparing a urea-aldehyde condensate by reacting urea and aldehyde in the approximate proportion of 1 mol. of urea to 2 mols. of aldehyde at low temperature to a stage at which an opaque resinous mass is formed, while the urea-aldehyde condensate is still ungeled forming a homogeneous mass of the condensate with an unmodified polyhydric alcohol and reacting the said homogeneous mass with a polybasic carboxylic acid with heating to a temperature sufficiently high to drive off water and fuse the polybasic carboxylic acid and not substantially above 320° F., the proportions of the additions to each other and to the urea-aldehyde condensate being such that the polyhydric alcohol is in excess of the polybasic carboxylic acid and such that each of them is in excess of the condensate, and then with further temperature elevation making at least one addition of glacial acetic acid.

4. The herein described method of producing a modified urea-formaldehyde resin by following the sequential steps of preparing a urea-formaldehyde condensate by reacting urea and formaldehyde in the approximate proportion of 1 mol. of urea to 2 mols. of formaldehyde at low temperature to a stage at which an opaque resinous mass is formed, while the urea-formaldehyde condensate is still ungeled forming a homogeneous mass of the condensate with an unmodified polyhydric alcohol and reacting the said homogeneous mass with a polybasic carboxylic acid with heating to a temperature sufficiently high to drive off water and fuse the polybasic carboxylic acid and not substantially above 320° F., the proportions of the additions to each other and to the urea-formaldehyde condensate being such that the polyhydric alcohol is in excess of the polybasic carboxylic acid and such that each of them is in excess of the condensate, and then with further temperature elevation making at least one addition of glacial acetic acid.

5. The herein described method of producing a modified urea-aldehyde resin by following the sequential steps of preparing a urea-aldehyde condensate by reacting urea and aldehyde in the approximate proportion of 1 mol. of urea to 2 mols. of aldehyde at low temperature to a stage at which an opaque resinous mass is formed, while the urea-aldehyde condensate is still ungeled forming a homogeneous mass of the condensate with an unmodified polyhydric alcohol and reacting the said homogeneous mass with a polybasic carboxylic acid with heating to a temperature sufficiently high to drive off water and fuse the polybasic carboxyl acid and not substantially above 320° F., the proportions of the additions to each other and to the urea-aldehyde condensate being such that the polyhydric alcohol is in excess of the polybasic carboxylic acid and such that each of them is in excess of the condensate, and then with further temperature elevation making at least one addition of acrylic acid.

6. The herein described method of producing a modified urea-formaldehyde resin by following the sequential steps of preparing a urea-formaldehyde condensate by reacting urea and formaldehyde in the approximate proportion if 1 mol. of urea to 2 mols. of formaldehyde at low temperature to a stage at which an opaque resinous mass is formed, while the urea-formaldehyde condensate is still ungeled forming a homogeneous mass of the condensate with an unmodified polyhydric alcohol and reacting the said homogeneous mass with a polybasic carboxylic acid with heating to a temperature sufficiently high to drive off water and fuse the polybasic carboxylic acid and not substantially above 320° F., the proportions of the additions to each other and to the urea-formaldehyde condensate being such that the polyhydric alcohol is in excess of the polybasic carboxylic acid and such that each of them is in excess of the condensate, and then with further temperature elevation making at least one addition of acrylic acid.

7. The herein described method of producing a modified urea-aldehyde resin by following the sequential steps of preparing a urea-aldehyde condensate by reacting urea and aldehyde in the approximate proportion of 1 mol. of urea to 2 mols. of aldehyde at low temperature to a stage at which an opaque resinous mass is formed, while the urea-aldehyde condensate is still ungeled forming a homogeneous mass of the condensate with an unmodified polyhydric alcohol and reacting the said homogeneous mass with a polybasic carboxylic acid with heating to a temperature sufficiently high to drive off water and fuse the polybasic carboxylic acid and not substantially above 320° F., the proportions of the additions to each other and to the urea-aldehyde condensate being such that the polyhydric alcohol is in excess of the polybasic carboxylic acid and such that each of them is in excess of the condensate, and then with further temperature elevation making at least one addition of lactic acid.

8. The herein described method of producing a modified urea-formaldehyde resin by following the sequential steps of preparing a urea-formaldehyde condensate by reacting urea and formaldehyde in the approximate proportion of 1 mol. of urea to 2 mols. of formaldehyde at low temperature to a stage at which an opaque resinous mass is formed, while the urea-formaldehyde condensate is still ungeled forming a homogeneous mass of the condensate with an unmodified polyhydric alcohol and reacting the said homogeneous mass with a polybasic carboxylic acid with heating to a temperature sufficiently high to drive off water and fuse the polybasic carboxylic acid and not substantially above 320° F., the proportions of the additions to each other and to the urea-formaldehyde condensate being such that the polyhydric alcohol is in excess of the polybasic carboxylic acid and such that each of them is in excess of the condensate, and then with further temperature elevation making at least one addition of lactic acid.

SAMUEL S. GUTKIN.

CERTIFICATE OF CORRECTION.

Patent No. 2,374,812.                      May 1, 1945.

SAMUEL S. GUTKIN.

It is hereby certified that error appears in the above numbered patent requiring correction as follows: The specification and claims of application Serial No. 498,727, Patent No. 2,374,811 and application Serial No. 498,728, Patent No. 2,374,812 were inadvertently transposed, therefore, in the heading to the printed specification of this patent, line 8, for "Serial No. 498,728" read --Serial No. 498,727--; and that the said Letters Patent should be read with this correction therein that the same may conform to the record of the case in the Patent Office.

Signed and sealed this 27th day of November, A. D. 1945.

Leslie Frazer (Seal)                      First Assistant Commissioner of Patents.

acid and not substantially above 320° F., the proportions of the additions to each other and to the urea-formaldehyde condensate being such that the polyhydric alcohol is in excess of the polybasic carboxylic acid and such that each of them is in excess of the condensate, and then with further temperature elevation making at least one addition of glacial acetic acid.

5. The herein described method of producing a modified urea-aldehyde resin by following the sequential steps of preparing a urea-aldehyde condensate by reacting urea and aldehyde in the approximate proportion of 1 mol. of urea to 2 mols. of aldehyde at low temperature to a stage at which an opaque resinous mass is formed, while the urea-aldehyde condensate is still ungeled forming a homogeneous mass of the condensate with an unmodified polyhydric alcohol and reacting the said homogeneous mass with a polybasic carboxylic acid with heating to a temperature sufficiently high to drive off water and fuse the polybasic carboxyl acid and not substantially above 320° F., the proportions of the additions to each other and to the urea-aldehyde condensate being such that the polyhydric alcohol is in excess of the polybasic carboxylic acid and such that each of them is in excess of the condensate, and then with further temperature elevation making at least one addition of acrylic acid.

6. The herein described method of producing a modified urea-formaldehyde resin by following the sequential steps of preparing a urea-formaldehyde condensate by reacting urea and formaldehyde in the approximate proportion if 1 mol. of urea to 2 mols. of formaldehyde at low temperature to a stage at which an opaque resinous mass is formed, while the urea-formaldehyde condensate is still ungeled forming a homogeneous mass of the condensate with an unmodified polyhydric alcohol and reacting the said homogeneous mass with a polybasic carboxylic acid with heating to a temperature sufficiently high to drive off water and fuse the polybasic carboxylic acid and not substantially above 320° F., the proportions of the additions to each other and to the urea-formaldehyde condensate being such that the polyhydric alcohol is in excess of the polybasic carboxylic acid and such that each of them is in excess of the condensate, and then with further temperature elevation making at least one addition of acrylic acid.

7. The herein described method of producing a modified urea-aldehyde resin by following the sequential steps of preparing a urea-aldehyde condensate by reacting urea and aldehyde in the approximate proportion of 1 mol. of urea to 2 mols. of aldehyde at low temperature to a stage at which an opaque resinous mass is formed, while the urea-aldehyde condensate is still ungeled forming a homogeneous mass of the condensate with an unmodified polyhydric alcohol and reacting the said homogeneous mass with a polybasic carboxylic acid with heating to a temperature sufficiently high to drive off water and fuse the polybasic carboxylic acid and not substantially above 320° F., the proportions of the additions to each other and to the urea-aldehyde condensate being such that the polyhydric alcohol is in excess of the polybasic carboxylic acid and such that each of them is in excess of the condensate, and then with further temperature elevation making at least one addition of lactic acid.

8. The herein described method of producing a modified urea-formaldehyde resin by following the sequential steps of preparing a urea-formaldehyde condensate by reacting urea and formaldehyde in the approximate proportion of 1 mol. of urea to 2 mols. of formaldehyde at low temperature to a stage at which an opaque resinous mass is formed, while the urea-formaldehyde condensate is still ungeled forming a homogeneous mass of the condensate with an unmodified polyhydric alcohol and reacting the said homogeneous mass with a polybasic carboxylic acid with heating to a temperature sufficiently high to drive off water and fuse the polybasic carboxylic acid and not substantially above 320° F., the proportions of the additions to each other and to the urea-formaldehyde condensate being such that the polyhydric alcohol is in excess of the polybasic carboxylic acid and such that each of them is in excess of the condensate, and then with further temperature elevation making at least one addition of lactic acid.

SAMUEL S. GUTKIN.

CERTIFICATE OF CORRECTION.

Patent No. 2,374,812.                May 1, 1945.

SAMUEL S. GUTKIN.

It is hereby certified that error appears in the above numbered patent requiring correction as follows: The specification and claims of application Serial No. 498,727, Patent No. 2,374,811 and application Serial No. 498,728, Patent No. 2,374,812 were inadvertently transposed, therefore, in the heading to the printed specification of this patent, line 8, for "Serial No. 498,728" read --Serial No. 498,727--; and that the said Letters Patent should be read with this correction therein that the same may conform to the record of the case in the Patent Office.

Signed and sealed this 27th day of November, A. D. 1945.

Leslie Frazer (Seal)                First Assistant Commissioner of Patents.